April 8, 1930. W. R. BLAIR 1,753,399
OCEAN GOING WATER CRAFT
Filed June 26, 1929
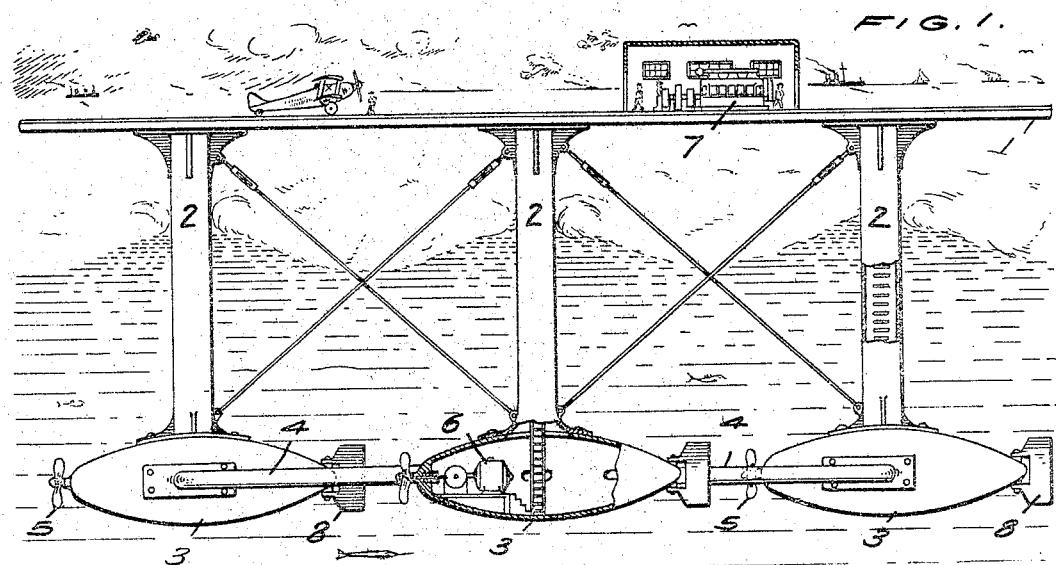
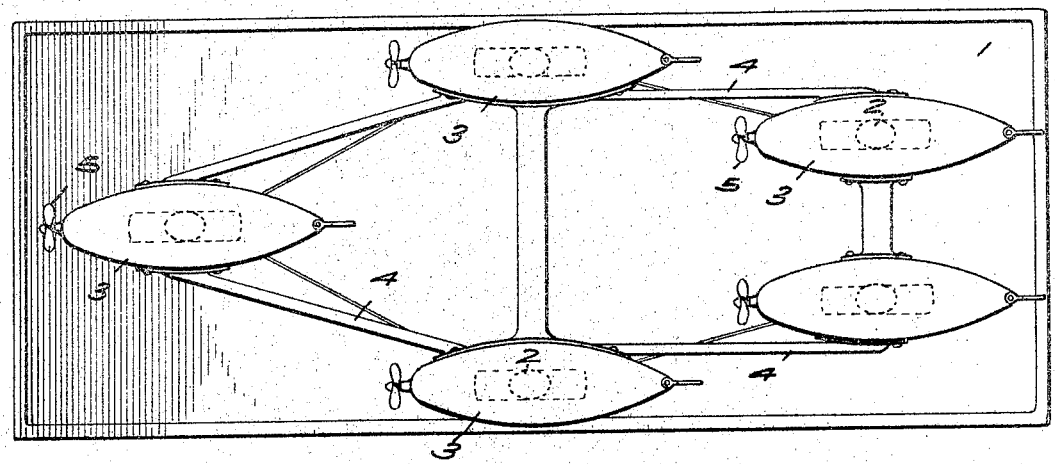
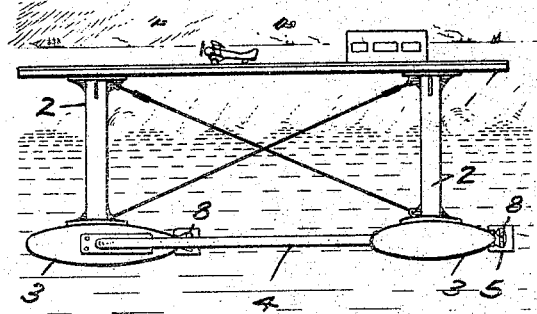
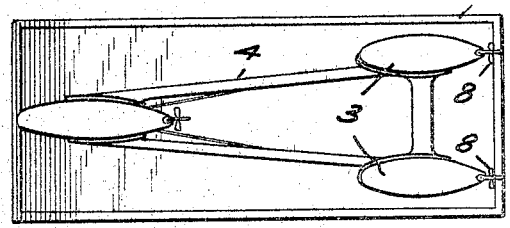

Patented Apr. 8, 1930

1,753,399

UNITED STATES PATENT OFFICE

WILLIAM R. BLAIR, OF WASHINGTON, DISTRICT OF COLUMBIA

OCEAN-GOING WATER CRAFT

Application filed June 26, 1929. Serial No. 373,828.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to ocean going water craft especially designed for rough water use.

Objects of this invention are to provide ocean going water craft of greater stability which are better adapted to combined air and sea borne trade and which combine greater speed with safety than is possible with present styled water craft.

These and other objects will become apparent by referring to the following description and the accompanying drawings:

Fig. 1 is a partially broken away representation of this invention in side elevation.

Fig. 2 is a bottom plan view.

Figs. 3 and 4 are modifications of corresponding views of Figs. 1 and 2.

This invention employs a load carrying body 1, supported above the reach of surface waves by strut members 2 carried by sub-surface hulls 3. These hulls are positioned beneath the disturbed sea surface and are consequently in comparatively quiet water.

In order to maintain the hulls in their proper relative positions, connecting members 4 are employed to connect the hulls to each other, thus forming a rigidly braced and properly spaced hull group.

Propellers 5 operated by any motive power, for instance electric motors 6 supplied with power by the motor generator units 7, may be utilized to drive the craft, other forms of propulsion of course being capable of substitution. Rudders 8 are preferably used to control the direction of the craft.

By having the hulls positioned in the quiet under-surface water and by supporting the load carrying body above the reach of waves by strut members which are sufficiently small in cross sectional area to prevent the sea surface wave motion having any appreciable effect on same, this invention provides a craft which is comparatively steady in all seas. Such a craft is capable of providing a safe landing and take-off for airplanes, and when two of such craft are provided, cargo may be transferred from one to the other regardless of weather conditions. Further by having a plurality of hulls positioned as shown in the drawings it is possible to apply greater power to the craft as a unit that it is to the conventional hull structure. This is due to the fact that the axis of thrust of the propellers is parallel to the line of travel, instead of angular, and also because any number of propelling units may be used. The number of propelling units applicable to the conventional hull is of course very limited.

So as to increase the practicability of the craft the hulls are preferably positioned, as shown in Figs. 2 and 4, so that the back wash of the propellers of each preceding hull cannot impinge upon the propeller of the following hull and thereby cause a loss of that propeller's effective thrust.

This positioning of the hulls accomplishes a further useful result. It will be noted, by reference to the drawings, that as each hull is a little to one side of the preceding hull the water displaced by this preceding hull, and which will of necessity be traveling forward, will greatly aid the next immediately following hulls by placing them in a forwardly moving current of water. This principle has heretofore been applied to aviation by flying airplanes in V formation but it has not been applied to water craft in such a manner as to increase the efficiency of a single craft composed of a plurality of spaced sub-surface hulls.

I claim:

1. A sea going water craft comprising a plurality of supporting hulls, with propelling means, positioned in the water beneath the disturbed sea surface said hulls being arranged so that the propelling means of each hull will operate on water undisturbed by the propelling means of the other hulls, struts extending upwards from each of said hulls to a position above the disturbed sea surface, and load carrying means supported by said struts.

2. A sea going water craft comprising a plurality of connected supporting hulls positioned beneath the disturbed sea surface said hulls being arranged so that water displaced by one or more of the hulls, due to movement of the craft, will reduce the head resistance exerted by the water on the remaining hulls, struts extending upwards from each of said hulls to a position above the disturbed sea surface and load carrying means supported by said struts.

In testimony whereof I affix my signature.

WILLIAM R. BLAIR.